US011874859B2

(12) United States Patent
Zevaka et al.

(10) Patent No.: US 11,874,859 B2
(45) Date of Patent: Jan. 16, 2024

(54) METHOD OF AND SYSTEM FOR DEFINING A SERVICE FOR SERVING MAP IMAGES

(71) Applicant: Nearmap Australia Pty Ltd, Barangaroo (AU)

(72) Inventors: Igor Zevaka, Winston Hills (AU); Simon John Cochrane, Helensburgh (AU)

(*) Notice: Subject to any disclaimer, the term of this patent is extended or adjusted under 35 U.S.C. 154(b) by 8 days.

(21) Appl. No.: 17/372,905

(22) Filed: Jul. 12, 2021

(65) Prior Publication Data

US 2021/0342374 A1 Nov. 4, 2021

Related U.S. Application Data

(63) Continuation of application No. PCT/AU2020/000011, filed on Jan. 30, 2020.

(60) Provisional application No. 62/800,569, filed on Feb. 4, 2019.

(51) Int. Cl.
*G06F 16/29* (2019.01)
*G06F 16/2455* (2019.01)

(52) U.S. Cl.
CPC .......... *G06F 16/29* (2019.01); *G06F 16/2455* (2019.01)

(58) Field of Classification Search
None
See application file for complete search history.

(56) References Cited

U.S. PATENT DOCUMENTS

| | | | |
|---|---|---|---|
| 7,925,982 B2 * | 4/2011 | Parker | G06F 16/29 707/763 |
| 2002/0067353 A1 | 6/2002 | Kenyon et al. | 345/419 |
| 2006/0242110 A1 | 10/2006 | Goldstein | 707/1 |
| 2007/0226314 A1 * | 9/2007 | Eick | G06F 16/986 709/217 |
| 2007/0276816 A1 | 11/2007 | Sample et al. | 707/3 |
| 2008/0059889 A1 | 3/2008 | Parker | |
| 2008/0065658 A1 | 3/2008 | Sharma et al. | 707/100 |
| 2008/0174593 A1 | 7/2008 | Ham et al. | 345/418 |

(Continued)

FOREIGN PATENT DOCUMENTS

| | | |
|---|---|---|
| AU | 2020219181 | 7/2021 |
| CA | 2562203 | 3/2008 |

(Continued)

OTHER PUBLICATIONS

Supplementart European Search results Citations, Oct. 18, 2022.
(Continued)

*Primary Examiner* — Christopher J Raab
(74) *Attorney, Agent, or Firm* — Dov Rosenfeld; Inventek

(57) ABSTRACT

A system for and method of generating an API or an API template for use with a map service. The API, e.g., URL when invoked in a WMS server or WMTS server, causes generating a metadata for a set of one or more areas of interest (AOIs) and one or more date ranges. The metadata provides access to a dataset of surveys via getmap or gettile requests. The API is dynamic in that the effect of the API (the metadata generated) is automatically updated whenever there has been a new survey added in the set of AOIs and date ranges. The API template is for a TMS service, and when populated, provides for causing any tiled map in the set of AOIs and date ranges to be displayed.

29 Claims, 5 Drawing Sheets

(56) References Cited

U.S. PATENT DOCUMENTS

| | | | |
|---|---|---|---|
| 2009/0043486 A1* | 2/2009 | Yang | G01C 21/3492 |
| | | | 701/117 |
| 2009/0089078 A1 | 4/2009 | Bursey | 705/1 |
| 2010/0287199 A1 | 11/2010 | Fuhry et al. | 707/720 |
| 2011/0270833 A1 | 11/2011 | Von Kaenel et al. | 707/736 |
| 2013/0167049 A1 | 6/2013 | Seo et al. | 715/762 |
| 2015/0229728 A1 | 8/2015 | Savolainen | |
| 2015/0262399 A1 | 9/2015 | Popescu | 345/419 |
| 2015/0293764 A1* | 10/2015 | Visvanathan | G06F 8/36 |
| | | | 717/102 |
| 2015/0304459 A1* | 10/2015 | Pakula | H04L 69/164 |
| | | | 709/203 |
| 2021/0342374 A1* | 11/2021 | Zevaka | G06F 16/29 |

FOREIGN PATENT DOCUMENTS

| | | | |
|---|---|---|---|
| CA | 3127955 | 7/2021 | |
| CN | 202080012581.4 | 8/2021 | |
| EP | 3133510 A1 * | 2/2017 | G01C 21/3667 |
| EP | 3133510 A1 | 2/2017 | |
| EP | 20753201.1 | 9/2021 | |
| JP | 2021-545382 | 8/2021 | |
| KR | A1020090005554 | 1/2009 | G06Q 50/10 |
| KR | 10-2021-7028204 | 9/2021 | |
| SG | 11202107644 W | 7/2021 | |
| WO | WO2015/073641 A2 | 5/2015 | G06F 17/00 |
| WO | WO2015/073641 A3 | 5/2015 | G06F 17/00 |

OTHER PUBLICATIONS

Supplementary European Search result detailed explanation, Oct. 28, 2022.
PCT/AU2020/000011, Feb. 4, 2020.
International Search Report on parent International Application PCT/AU2020/000011 dated Aug. 13, 2020.
Written Opinion of the International Searching Authority on parent International Application PCT/AU2020/000011 dated Aug. 13, 2020.
Written Opinion on Singapore Patent Application No. 11202107644W dated Aug. 17, 2023.
Office Action dated Oct. 31, 2023 on counterpart Japanese Application 2021-545382, and translation thereof.
Hashimoto Yuichi, *Basics of QGIS and its Use in Disaster Prevention, 2nd ed.*, Japan, Kokon Shoin, Oct. 17, 2017, pp. 116-132 (In Japanese).

* cited by examiner

METHOD OF AND SYSTEM FOR DEFINING A SERVICE FOR SERVING MAP IMAGES

RELATED APPLICATIONS

The present application is a continuation of international application PCT/AU2020/000011 having an international filing date of Jan. 30, 2020. PCT/AU2020/000011 claims benefit of priority to U.S. Prov. Pat. Appl. No. 62/800,569 filed Feb. 4, 2019. The contents of both U.S. Prov. Pat. Appl. No. 62/800,569 and international application PCT/AU2020/000011 are incorporated herein by reference.

FIELD OF INVENTION

This invention relates to geographic information systems (GISs), in particular to systems and methods for automatically determining a script to display a map of a set of surveys such that the set of surveys is limited by one or more user-defined areas of interest and range of one or more dates, and such the set is automatically updated every time the script is used.

BACKGROUND

Web Map Service (WMS) is a commonly used Open Geospatial Consortium (OGC) standard web protocol for serving geo-referenced map images that can be used to integrate surveys, e.g., photomaps (photographic maps and a set of one or more layers) into geographic information systems (GIS) tools. A WMS server allows for use of data from several different servers, and enables for the creation of a network of Map Servers from which clients can build customized maps. WMS servers interact with their clients via APIs that use the HTTP protocol, i.e., the APIs are in the form of URLs. A WMS-compliant server can handle at least the following two types of WMS requests: a GetCapabilities request that returns metadata in the form of an XML document regarding the WMS server's information, and a GetMap request that returns an image of a map according to the user's needs. A WMS server generates a map image for each client request for an image. In the context of the present invention, a WMS server means a WMS-like server that includes the repositories described herein, even though the protocol may not strictly conform to the OGC WMS standard.

A tiled map or tile map (raster or vector) is a map displayed, e.g., in a browser, by seamlessly joining dozens of individually requested image tiles over a network, e.g., the Internet.

The WMS standard allows a client to request an arbitrary region. If the client coupled to the WMS server wants tiles, it can makes its requests in a tiled pattern, but the WMS server has no way to know that's what's happening and if the server stores the map as tiles of its own, it has no way to let the client know what the tile arrangement is.

Web Map Tile Service (WMTS) is an OGC protocol for serving pre-rendered or run-time computed georeferenced map tiles over the Internet. Because the tiles, typically 256 by 256, are cached or pre-rendered, WMTS can serve images of an area much faster, while, for example, the pre-rendering occurs separately or in parallel.

In WMTS, the capabilities structure describe TileMatrix-Set which is a set of quantized integer coordinates such as TileMatrix (the zoom level), Row number (X dimension), and Column number (Y dimension), which in turn can be used to request tiled imagery. An image tile is requested using the three integer coordinates that always refer to the same geographical area. In WMTS, unlike WMS, where a GetMap request can describe an arbitrary bounding box, a WMTS GetTile request is made in accordance to the TileMatrixSet specification. The bounding box of the request can be calculated from the GetTile coordinates.

An earlier widely adopted protocol for tiled maps is called Tile Map Service (TMS), by the Open Source Geospatial Foundation (GeoOS), and like WMTS is used for serving pre-rendered or run-time computed georeferenced map tiles over the Internet. It is less complex specification than WMTS, however uses similar parameters for specifying a tiled map. TMS uses integer indices for the tiles rather than requiring the client to request a bounding box that aligns with a particular grid. Another service similar to TMS is OpenStreetMap, which is regarded herein as a variation of TMS.

A user may create an individual WMS, TMS, or WMTS service. Such a service may have a name, a layer name format, and a set of one or more areas of interest (AOIs). A client, e.g., a WMS, TMS, or WMTS client is a client system that is coupled to a WMS, TMS, or WMTS server, respectfully, and is able to display map images on a display.

In the context of the present invention, a WMS client means a WMS-like client that is couples to a WMS-like server, even though the protocols used may not strictly conform to the OGC WMS standard. Similarly, a TMS or WMTS client means a TMS-like or WMTS-like client that is couples to a TMS-like or WMTS-like server, respectively, even though the protocols used may not strictly conform to the TMS specification or the OGC WMTS standard.

Data sets in a geographical information system (GIS) are typically static, in that are created once and they do not vary. It would be advantageous to be able to create services that provide access to each service's underlying repository of data without duplicating the spatial data, and limited to one or more user-defined areas of interest and dates/times. It also would be advantageous to have a GIS in which the dataset is dynamic in that it is automatically updated whenever there is a new survey or tile within the one or more user-defined areas of interest and date/times added to the GIS, e.g., an aerial photograph at a location taken at a new particular time within a range of one or more dates/times. It would be advantageous that the next time a user accesses the particular location within the date/time range, the newly added survey would automatically be available for the user.

BRIEF DESCRIPTION OF THE DRAWINGS

The following drawings and the associated descriptions are provided to illustrate embodiments of the present disclosure and do not limit the scope of the invention; the scope is defined by the claims. Aspects of and advantages of this disclosure will become more readily appreciated as these aspects and advantages become better understood by reference to the following detailed description, when taken in conjunction with the accompanying drawings, wherein:

DETAILED DESCRIPTION OF EXAMPLE EMBODIMENTS

Overview

Figure 1:
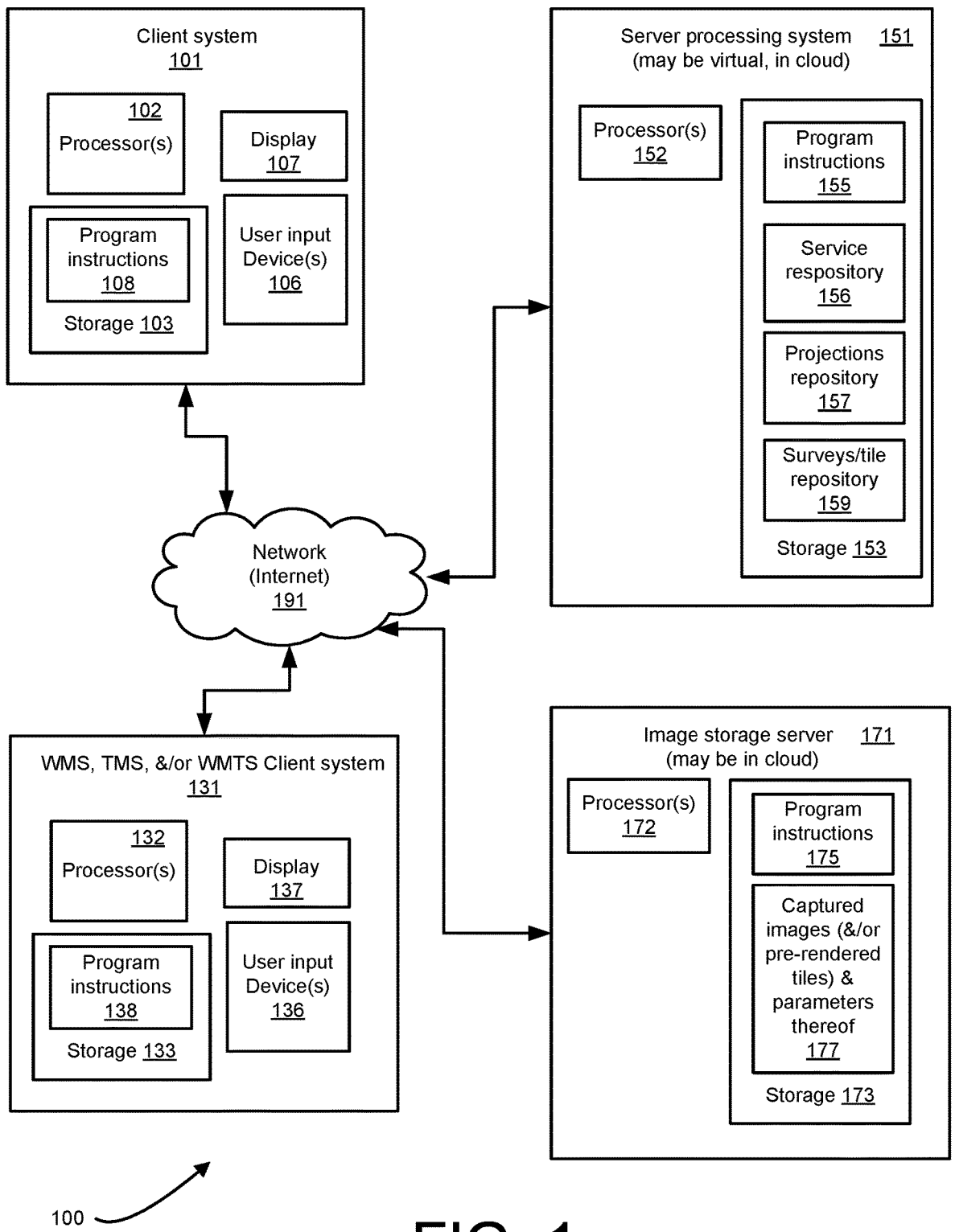
FIG. 1 shows a simplified schematic of an example system with elements in which some embodiments of the present invention may operate.

Described herein is a system for and method of generating a GIS service and an API, e.g., a URL therefor that when invoked, causes generating a capabilities API, e.g., a capabilities XML for a set of one or more areas of interest (AOIs) and one or more date ranges therefor that provides access to a dataset of surveys, the dataset of surveys accessed by the API being dynamic in that it is automatically updated whenever there has been a new survey at a particular location within the set of AOIs and date ranges added to the GIS, e.g., an aerial photograph of an area within the AOI taken at a new particular time within one of the data ranges, such that the next time a user accesses the particular location, the added survey is available for the user. Note that a date may be a date and time combination, such that there may be two surveys at the same day but different "dates."

Using embodiments of the invention, a user may create a dynamic WMS, TMS, and/or WMTS service that contains only data desired by the user, e.g., of one or more AOIs in one or more date ranges (a date being a date may include time combination). Using an embodiment of the invention, a server accesses a map service (a survey provider) to extract only the desired AOI(s) and date(s) range(s), and stores it and provides the stored data and a service around it. In one embodiment, the WMS service includes an API which may be in the form of URL. Such API is generated in an embodiment of the invention.

One embodiment of the invention uses standard WMS features (or WMS-like features), such that a WMS server that conforms at least partially to the WMS standard may be used. Another embodiment of the invention uses standard WMTS features (or WMTS-like features), such that a WMTS server that conforms at least partially to the WMTS standard may be used. Yet another embodiment uses TMS features. Some embodiments include a combined server that can operate as a combination of two or more of a WMS server, a WMTS server, and a TMS map provider. Other embodiments would be clear to one of ordinary skill in the art.

A first set of embodiments includes a method of operating a client processing system to enable obtaining map imagery. The method comprises:
accepting from a user a definition of a set of one or more areas, each area having an associated area of interest ("AOI") and one or more associated dates;
sending information about the accepted definition of the one or more areas to a server processing system coupled to the client processing system by a network;
accepting from the server processing system an API for the set of one or more areas, or an API template for the set, the API or API template determined at the server, the accepted API being automatically updated whenever a respective AOI of a respective area of said set has new content made available by a survey provider, (a) wherein an API is accepted, such that using the accepted API by a map service client provides a mechanism for the map service client to request from a map service server for the map service and to obtain from the map service server responsive to the request metadata that provides one or more respective map-display APIs for each area to obtain map imagery using the provided respective map-display API, or (b) wherein an API template is accepted, such that populating the accepted API template forms one or more tiled map-display APIs for one or more respective areas in the set, the one or more tiled map-display APIs usable to obtain tiled map imagery from a service providing tiled maps.

In a first version, it is the API that is accepted from the server processing system, the map service client is a Web Map Service (WMS) client, and the map service server is a WMS server. In such a first version, using the accepted API by the WMS client provides a mechanism for the WMS client to request from the WMS server and obtain from the WMS server responsive to the request metadata that provides one or more respective map-display APIs for each area to obtain map imagery using the provided respective map-display API. The accepted API may be in the form of a URL usable by the WMS client as a GetCapabilities request, the metadata may be in the form of an XML structure, and each respective map-display API may a respective URL for a WMS GetMap request.

In a second version, it is also the API that is accepted from the server processing system. In such a second version, the map service client is a Web Map Tile Service (WMTS) client, and the map service server is a WMTS server. Using the accepted API by the WMTS client provides a mechanism for the WMTS client to request from the WMTS server and obtain from the WMTS server responsive to the request metadata that provides one or more respective tiled map-display APIs for each area to obtain tiled map imagery using the provided respective tiled map-display API. The accepted API may be in the form of a URL usable by that WMTS client as a GetCapabilities request, the metadata may be in the form of an XML structure, and each respective tiled map-display API may be a respective URL for a WMTS GetTile request.

In a third version, it is the API template that is accepted from the server processing system, the map service client is a Tile Map Service (TMS) client, and the map service server is a TMS server. Populating the accepted API template forms one or more tiled map-display APIs for one or more respective are as in the set, the one or more tiled map-display APIs usable to obtain tiled map imagery. The sent API template may be in the form of a URL template, and each respective tiled map-display API is a respective URL for a TMS tiled map display request.

A second set of embodiments includes a method of operating a server processing system to enable obtaining map imagery. The method comprises:
accepting from a client processing system a definition of a set of one or more areas, each area having an associated area of interest ("AOI") and one or more associated dates; and
generating and sending to the client processing system an API for the set of one or more areas, or an API template for the set, the sent API or API template determined at the server, the sent API being automatically updated whenever a respective AOI of a respective area of said set has new content made available by a survey provider, (a) wherein the API is sent, and using the sent API by a map service client provides a mechanism for the map service client to request from a map service server for the map service and to obtain from the map service server responsive to the request metadata that provides one or more respective map-display APIs for each area to obtain map imagery using the provided respective map-display API, or (b) wherein the API template is sent, and populating the sent API template forms one or more tiled map-display APIs for one or more respective areas in the set, the one or more map-display APIs usable to obtain tiled map imagery from a service providing tiled maps.

In some versions, the accepted definition is of a user defined service for the set of for one or more areas including a service name for the user defined service using a user-specified naming convention for services ("service naming convention"). Each area of the user-defined service has a named associated AOI, and the one or more associated dates are a single associated date or an associated range of dates.

In a first version, it is the API that is sent, the map service client is a Web Map Service (WMS) client, and the map service server is a WMS server. In such a first version, using the sent API by the WMS client provides a mechanism for the WMS client to request from the WMS server and obtain from the WMS server responsive to the request metadata that provides one or more respective map-display APIs for each area to obtain map imagery using the provided respective map-display API. The sent API may be in the form of a URL usable by the WMS client as a GetCapabilities request, the metadata may be in the form of an XML structure, and each respective map-display API may a respective URL for a WMS GetMap request.

In a second version, it is also the API that is sent. In such a second version, the map service client is a Web Map Tile Service (WMTS) client, and the map service server is a WMTS server. Using the sent API by the WMTS client provides a mechanism for the WMTS client to request from the WMTS server and obtain from the WMTS server responsive to the request metadata that provides one or more respective tiled map-display APIs for each area to obtain tiled map imagery using the provided respective tiled map-display API. The sent API may be in the form of a URL usable by that WMTS client as a GetCapabilities request, the metadata may be in the form of an XML structure, and each respective tiled map-display API may be a respective URL for a WMTS GetTile request.

In a third version, it is the API template that is sent, the map service client is a Tile Map Service (TMS) client, and the map service server is a TMS server. Populating the sent API template forms one or more tiled map-display APIs for one or more respective are as in the set, the one or more tiled map-display APIs usable to obtain tiled map imagery. The sent API template may be in the form of a URL template, and each respective tiled map-display API is a respective URL for a TMS tiled map display request.

In some of the above respective versions of the sets of embodiments, the functionality of the WMS client, the WMTS client, or the TMS client may be carried out at the client processing system.

In some of the above respective versions of the sets of embodiments, each area may have one or more user-generated associated filters that are sent by the client processing system to the server processing system.

in the above sets of embodiments, the accepted definition may be of a user defined service for the set of for one or more areas including a service name for the user defined service using a user-specified naming convention for services ("service naming convention"). Each area of the user-defined service may have a named associated AOI, and the one or more associated dates may be a single associated date or an associated range of dates.

Particular embodiments include a non-transitory machine-readable medium comprising instructions that when executed on one or more processors of a processing system carry out a method. In different embodiments, the method is as recited in any version of the above sets of method embodiments. Thus, depending on which set of method embodiments, the processing system may be a client processing system, or the processing system may be a server processing system.

Particular embodiments include a processing system comprising one or more processors and a storage subsystem, the storage subsystem comprising instructions that when carried out by at least one or the processors carries out a method. In different embodiments, the method is as recited in any version of the above method embodiments. Thus, the processing system may be a client processing system, or the processing system may be a server processing system.

Particular embodiments may provide all, some, or none of these aspects, features, or advantages. Particular embodiments may provide one or more other aspects, features, or advantages, one or more of which may be readily apparent to a person skilled in the art from the figures, descriptions, and claims herein.

Glossary

The following is a set of terms used in this description and claims, and also commonly used in geographic information systems (GIS).

Area of interest (AOI)—A geographical area of interest to the user, typically having a name, and defined by a bounding polygon.

Area—An AOI typically having a respective name and date or range of dates. A date may include a time.

API: A set of functions and procedures allowing the creation of applications that access the features or data of an operating system, application, or other service. In the context of the present invention, an API is a mechanism for invoking an individual WMS service or WMTS service (see below for WMS and WMTS).

Bounding box (bbox)—A rectangular geographical area defined by two points at the ends of a diagonal, the other vertices of the rectangle implied or readily calculated. Of course, all four vertices may be explicitly specified.

Bounding polygon—An arbitrary polygonal shape defined by a set of points.

Date—a date is the chronological date and may include time, such that two times on the same day may define two different dates in the context of this disclosure.

Spatial intersection—The spatial intersection of two regions is the area common to both regions.

Service—An individual WMS or WMTS service (see below for WMS and WMTS) that a user may create to define areas. A service may have a name, a layer name format, and a set of one or more areas (AOIs and date ranges). In some embodiments of the invention, a service may have generated for it a capabilities API in the form of a URL.

Service repository: A database (DB) of user-created services.

Survey—A single capture of a geographic area (a region), typically captured within one day. A survey may have an associated region name, state, country, bounding polygon, date of capture, and possibly other metadata about the survey.

Survey repository—Database of surveys that each may have as metadata: an associate region name, state, country, bounding polygon, date of capture, and possibly other metadata. A survey provider makes surveys available to the survey repository.

Tile—A pre-rendered, e.g., 256 by 256 pixel image of a geographic area. Maps may be made up of by joining tiles, such that a tiled map may be specified by a number that indicates a zoom level, e.g., as the number of tiles per side. A tiled map may have an associated region name, state, country, X-coordinate, e.g., as an integer, Y-coordinate, e.g., as an integer, date of capture, and possibly other metadata about the tiled map.

Tile repository—a database of tiles. Tiles are made available to the tile repository by a survey provider.

Projection—the systematic transformation of points on a globe into points on a planar map. One example is the Web Mercator projection. In some embodiments of the invention, a projection has a name, a code, e.g., a Spatial Reference System Identifier (SRID) code, a bbox, and a set of transformation parameters. An SRID code is typically passed to a WMS server via SRS (spatial reference system or CRS (coordinate system reference) parameters. In this context SRID, SRS, and CRS may be used interchangeably.

Projection repository—Database of spatial projections defined by name, code, and bounding box.

Web Map Service (WMS)—An Open Geospatial Consortium (OGC) standard web protocol for serving geo-referenced map images that can be used to integrate surveys, e.g., photomaps (photographic maps and a set of one or more layers) into geographic information systems (GIS) tools. In the context of the present invention, WMS means OGC WMS or a WMS-like service, even though the protocols used may not strictly conform to the OGC WMS standard.

WMS Servers—A WMS server allows for use of data from several different servers, and enables for the creation of a network of Map Servers from which clients can build customized maps. WMS servers interact with their clients via APIs that use the HTTP protocol, i.e., the APIs are in the form of URLs. In many cases, a WMS server is a Common Gateway Interface (CGI) program. The WMS specification defines a number of request types, and for each of them a set of query parameters and associated behaviors. A WMS server generates a map image for each client request for an image. A WMS-compliant server can handle at least the following two types of WMS requests: GetCapabilities that returns metadata of the WMS server's relevant information, the returned metadata in the form of an XML document, and GetMap that returns an image of a map according to the user's needs. In the context of the present invention, a WMS server means a WMS or WMS-like server that includes the repositories described herein, even though the protocol may not strictly conform to the OGC WMS standard.

WMS client—A WMS client system, or simply "WMS client" is a client system that is coupled to a WMS server, and is able to display map images on a display. The term WMS client may also refer to software that operates on a client processing system that when operating cause the client processing system to act as a WMS client system. Whether the term WMS client refers to a system or to software would be clear from the context. In the context of the present invention, a WMS client means a WMS or WMS-like client that is couples to a WMS-like server, even though the protocols used may not strictly conform to the OGC WMS standard.

Web Map Tile Service (WMTS)—An OGC protocol for serving pre-rendered or run-time computed georeferenced map tiles, e.g., 256 by 256 pixels over the Internet. Because the tiles, typically 256 by 256, are cached or pre-rendered, while, for example, the pre-rendering occurs separately or in parallel. In the context of the present invention, WMTS means OGC WMTS or a WMTS-like service, even though the protocols used may not strictly conform to the OGC WMTS standard.

WMTS Server—A WMTS server allows for use of data from several different servers, and enables for the creation of a network of Map Servers from which clients can build customized maps. WMTS servers interact with their clients via APIs that use the HTTP protocol, i.e., the APIs are in the form of URLs. In many cases, a WMTS server is a Common Gateway Interface (CGI) program. The WMTS specification defines a number of request types, and for each of them a set of query parameters and associated behaviors. A WMTS server generates a tiled map image for each client request for a tiled map image. A WMTS-compliant server can handle at least the following two types of WMTS requests: GetCapabilities that returns metadata of the WMTS server's relevant information, the returned metadata in the form of an XML document with, and GetTile that returns a single tile image in a region specified by the GetTile request that an application may compose to build a bigger map image. In the context of the present invention, a WMTS server means a WMTS or a WMTS-like server that includes the repositories described herein, even though the protocol may not strictly conform to the OGC WMTS standard.

WMTS client—A WMTS client system, or simply "WMTS client" is a client system that is coupled to a WMTS server, and is able to display map images on a display. The term WMTS client may also refer to software that operates on a client processing system that when operating cause the client processing system to act as a WMTS client system. Whether the term WMTS client refers to a system or to software would be clear from the context. In the context of the present invention, a WMTS client means a WMTS or a WMTS-like client that is couples to a WMTS-like server, even though the protocols used may not strictly conform to the OGC WMTS standard.

Tile Map Service (TMS)—A protocol by the Open Source Geospatial Foundation (OSGeo), that like WMTS is used for serving pre-rendered or run-time computed georeferenced map tiles over the Internet is a specification for tiled web maps. It is a less complex specification than WMTS, however uses similar parameters for specifying a tiled map. TMS uses integer indices for the tiles rather than like WMTS requiring the client to request a bounding box that aligns with a particular grid. TMS does not define a GetCapabilities request or provide a capabilities response. However, human readable documentation exists for how to construct a URL to display a tiled image. In the context of the present invention, TMS means OSGeo TMS or a TMS-like service that may not strictly conform to the OSGeo specification.

DESCRIPTION IN MORE DETAIL

Example System Architecture

FIG. 1 shows a simplified schematic of an example system 100 with elements in which embodiments of the present invention operate. The elements 101, 131, 151, and 171 are shown coupled via a network 191, e.g., the Internet. In many versions, elements 101 and 131 are combined into one processing system 101.

The system 100 includes a server processing system 151 that includes one or more processors 152 and storage 153. The storage 153 includes program instructions 155 that when executed carry out server-side aspects of embodiments of the invention, and in one embodiment, carry out the functions of a WMS server. In alternate embodiments, a separate processing system operates as a WMS server.

A user may interact with the server processing system 151 on a client processing system 101 that includes one or more processors 102, a display 107, a storage subsystem 103 (including memory), and one or more user input devices 106 that form a subsystem that enables a user to input information to the client processing system 101. The functions carried out by the client processing system 101 are described in instructions 108 stored in storage subsystem 103. Users may operate the client processing system 101 via respective user interfaces (UIs). The UIs are optionally presented (and person's instructions may be received) via the client processing system 101 using a browser, other network resource viewer, a dedicated application, or other input means. In general, a person (a user) may enter information into the client processing system by at least one of: hovering over, pointing at, or clicking on a particular item, providing verbal instructions via a microphone, the person may touch a touch screen, and the person may otherwise provide information. Thus, one or more user interfaces may be presented on user processing system 101. System 101 may be a laptop computer, a desktop computer, a user terminal, a tablet computer, a smart phone, or another terminal type. The user input device(s) may include one or more touch screens, microphones, touch pads, keyboards, mice, styluses, cameras, and so forth.

A user also may interacts with the server processing system 151 on a WMS, WMTS, and/or TMS client processing system 131 (WMS, WMTS, and/or TMS client 133), that includes one or more processors 132, a display 137, a storage subsystem 133 (including memory), and one or more user input devices 136 that form a subsystem that enables a user to display an image, and to point to and possibly to draw one or more geometric features in a displayed image. The server processing system program instructions 156 in one embodiment of the invention include instructions that enable the server processing system 151 to act as a WMS server. In another embodiment, the program instructions 156 include instructions that enable the server processing system 151 to act as a WMTS server. In yet another embodiment, the program instructions 156 include instructions that enable the server processing system 151 to act as a WMTS server and as a WMTS server. In yet another embodiment, the program instructions 156 include instructions that enable the server processing system 151 to act as a TMS server. The functions carried out by the WMS, WMTS, and/or TMS client processing system 131 are described in instructions 138 stored in storage subsystem 133. A WMS client is a system that is able to interact with a WMS server and complies with the OGC WMS standard. The OGC WMS and WMTS (or TMS) standards are used to retrieve online maps and tiled maps, respectively, via, in one embodiment, the Internet (HTTP). Maps can be linked from a web site, navigated with a professional GIS client, or used on mobile devices. Any application that needs map images (or tiled images) can use the OGC WMS (or WMTS or TMS) standard to get maps (or tiled maps). And because these are widely accepted industry standards, almost any map generating or using software can "speak" OGC WMS or WMTS, or OSGeo TMS allowing combining maps from several sources regardless of the underlying software implementation. A WMS client therefore can refer to WMS client software operating on any processing system. Users may operate the WMS client processing system 131 via respective user interfaces (UIs). The WMS client UIs are typically presented (and person's instructions may be received) via the client processing system 131 using a browser, other network resource viewer, a dedicated application, or other input means. Similarly, a WMTS client therefore can refer to WMTS client software operating on any processing system. Users may operate the WMTS client processing system 131 via respective user interfaces (UIs). The WMTS client UIs are typically presented (and person's instructions may be received) via the client processing system 131 using a browser, other network resource viewer, a dedicated application, or other input means. Similarly, a TMS client therefore can refer to TMS client software operating on any processing system. Users may operate the TMS client processing system 131 via respective user interfaces (UIs). The TMS client UIs are typically presented (and person's instructions may be received) via the client processing system 131 using a browser, other network resource viewer, a dedicated application, or other input means.

In some embodiments, WMS, WMTS, and/or TMS client software may be incorporated into the client processing system 101 as part of instructions 108 in the storage 103, such that the WMS, WMTS, and/or the TMS client system 131 is incorporated into client processing system 101.

In one embodiment, surveys are captured by a camera system (not shown) and stored in an image storage server 171, or in other embodiments, on a server processing system 151 on which embodiments of the invention operate. In some versions, the camera system may include with each survey camera parameters such as the camera identity, the camera location, a timestamp for the image, the camera orientation/rotation, the camera resolution, and other camera parameters, collectively called the camera model. In some embodiments, the images 177 are assumed already to have been stored in the image storage server 171.

The image storage server includes one or more processors and a storage subsystem 177 that includes memory and one or more other storage media. One or more images and are accepted, e.g., via the network 191 and an input port such as a network interface into the server processing system 151.

In some embodiments, image storage server 171 stores pre-rendered image tiles.

The elements shown in FIG. 1 form only one example of system architecture. In some embodiments, the server processing system may be operating in the Web, e.g., as one or more Web agents, so while such agents include program instructions (shown as 155) and such programming instructions operate on machines, the machines are not necessarily partitioned as individual processing systems as shown in FIG. 1. Furthermore, the machines may be virtual machines instantiated in the cloud. Similarly, the image storage server may be provided as a Web service in the cloud.

In other embodiments, the functionality of the image storage server 171 may be incorporated in the server processing system 151 using storage subsystems 153 for storing the captured images and metadata 177 about the images.

Typical Attributes of Services, Surveys, Areas, and Projections

The table below shows what attributes are used in one embodiment of the invention for a service (the user-defined service as described herein below), a survey, an area (AOI and date range), and a projection. Of course, other embodiments may use more or fewer attributes.

| Service | Survey | Area | Projection |
|---|---|---|---|
| Name | Region name (e.g., Sydney) | Name | Name |
| Layer name format pattern | Country/state (e.g., AU, NSW) | Bounding polygon | SRID (Spatial Reference System Identifier) |
| Generated API, e.g., URL (See FIG. 2) | Capture Date (e.g., 2018 Jan. 1) | Date range | Bbox (Bounding box) |
| | Bounding polygon | | Transformation parameters |

Tiled Maps

Some embodiments of the invention are for serving tiled maps.

The WMS standard allows the client to request an arbitrary region. If the client wants tiles, it can makes its requests in a tiled pattern, but the server has no way to know that's what's happening and if the server stores the map as tiles of its own, it has no way to let the client know what the tile arrangement is. The WMTS standard provides for defining a service that can serve tiled maps rather than maps. The Capabilities structure in WMTS describes TileMatrixSet, which is a set of quantized integer coordinates such as TileMatrix (the zoom level), Row number (X dimension), and Column number (Y dimension), which in turn can be used to request tiled imagery with a GetTile request. The three integer coordinates in the GetTile request always refer to the same geographical area. Unlike WMS, where a GetMap request can describe an arbitrary bbox, a WMTS GetTile request must be made in accordance to the TileMatrixSet specification. The bounding box of the request can be calculated from the GetTile coordinates.

The TMS standard is a much simpler protocol for tiled maps. TMS uses integer indices for the tiles rather than requiring the client to request a bounding box that aligns with a particular grid.

Some Example Flow Charts

Figure 2:
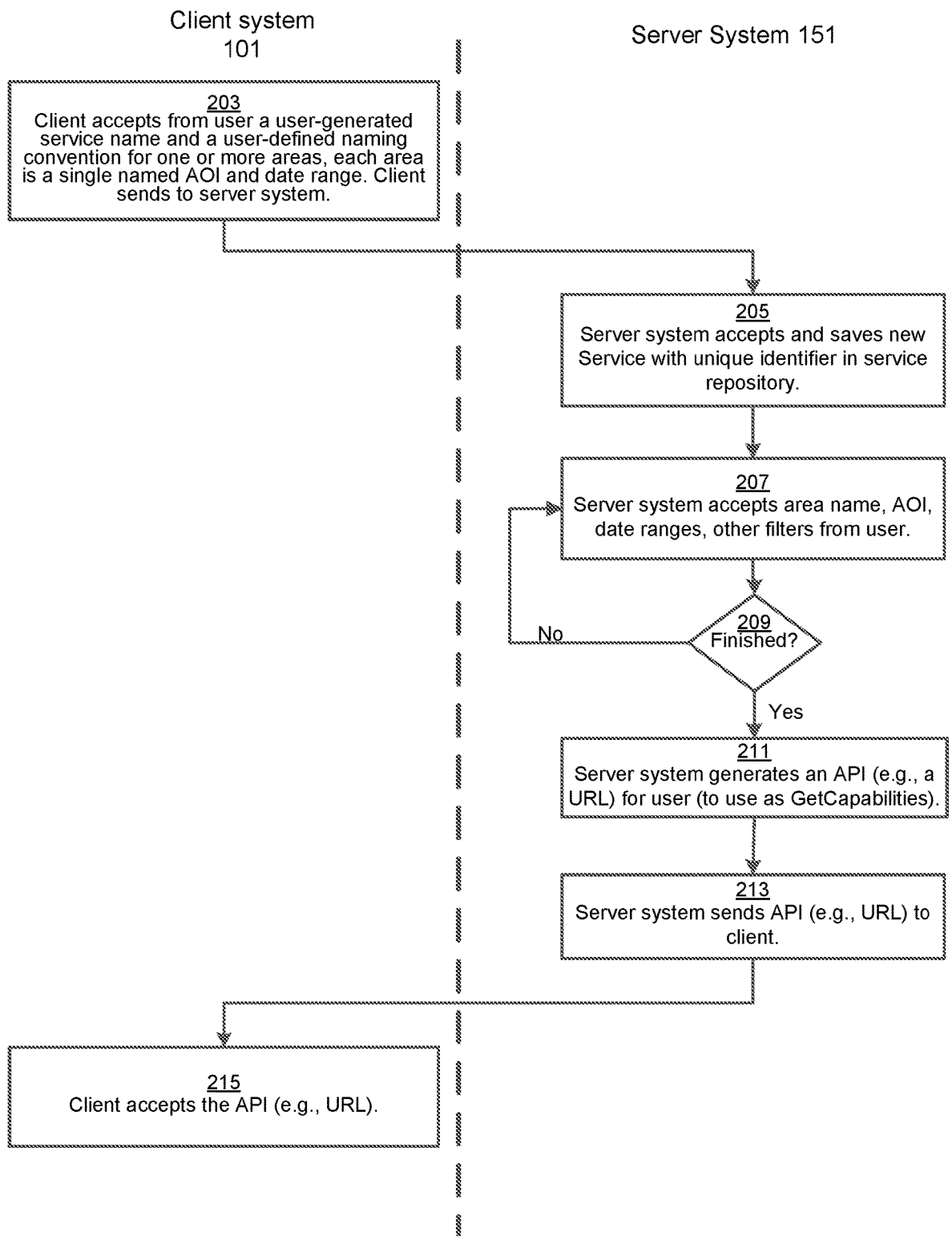
FIG. 2 shows, according to some embodiments of the present invention, a simplified flow chart of methods to obtain for a user an API, e.g., in the form of a URL for a user-specified service.

FIG. 2 shows, according to a WMS embodiment of the present invention, a simplified flow chart of methods 200 comprising a method at the client system 101 as instructed by a user, and a method at the server system 151 that is coupled to the client system 101, the methods operating to obtain for the user an API in the form of a URL for a user-specified service using a user-specified service naming convention for a number of areas, each area being a single named associated AOI, associated range of one or more dates, and optionally one or more other user-generated associated filters. The thus obtained URL for the user-specified service is usable by a WMS client, as a GetCapabilities request to enable a coupled WMS server to return metadata, e.g., in the form an XML document, about the areas, the metadata enabling an WMS client to obtain map imagery. The method provides to the user a service that is dynamic and that is user-specifiable. By dynamic is meant that the resulting API provides for any surveys in the AOI(s) to be automatically updated whenever new the respective AOI has new content made available by the survey provider. Using this API with a WMS client provides for the WMS client a capabilities response, e. g., the XML, containing a respective API (as a respective URL for GetMap) for each area (each named AOI and associated date range) to obtain map imagery using the provided GetMap URL.

The flowchart also is applicable to a WMTS embodiment, and also to a TMS embodiment.

In 203, the client system 101 accepts from user information describing (e.g., as a definition) a set of one or more areas, each area having an associated area of interest ("AOI") and one or more associated dates. In one embodiment, the information is in the form of a user-generated service name and a user-defined naming convention for a number of areas, each area having a single user-named AOI and associated date range. 203 includes the client system sending this information to the server system 151.

From here on the flowchart assumes the information is in the form of the definition of the service.

At the server system 151, in 205, the server system accepts and saves the new service definition with a unique identifier ("Service ID") in the server system's a service repository 156 maintained in the storage subsystem 153 of the server processing system 151. The service repository 156 comprises a collection of user defined services.

For each of the number of areas sent by the client system, in 207, the server system 151 accepts initially a first, then later the next user-supplied area name, the area's associated user-named AOI, the area's associated date ranges, and any of the area's other associated user-defined filters. In one version step 207 is repeated by checking, in 209, if all areas have been accepted. If not, the system repeats 207 including accepting the next user-supplied area name, associated AOI, associated date ranges, other user-defined filters.

Once all the user-specified areas have been accepted for the service, the server system in 211 generates an API, e.g., in the form of a URL for the user that the user can use, e.g., as a GetCapabilities request in a WMS (or WMTS) client to obtain metadata, e.g., in the form of an XML document from a WMS or WMTS server. The API is sent to the client system in 213.

The client system, in 215, accepts the API, e.g., the URL usable to send a GetCapabilities request to a WMS or WMTS server. In some embodiment, the client system also displays the URL to the client system's user.

The first parts of a WMTS embodiments and of a TMS embodiment also follow the flow chart of FIG. 2, with modifications for the differences. The WMTS embodiment is included in the drawing. The WMTS embodiment may also include a WMS embodiment, i.e., the same systems may operate with either WMS or WMTS. For example, in 211, in the WMTS case, the server system generates an API, e.g., a URL usable as a WMTS GetCapabilities request. In the TMS case, in 211, the server system generates a template for an API, e.g., generates a URL template that when populated with the relevant information, is directly usable to obtain tiled images.

Figure 3:
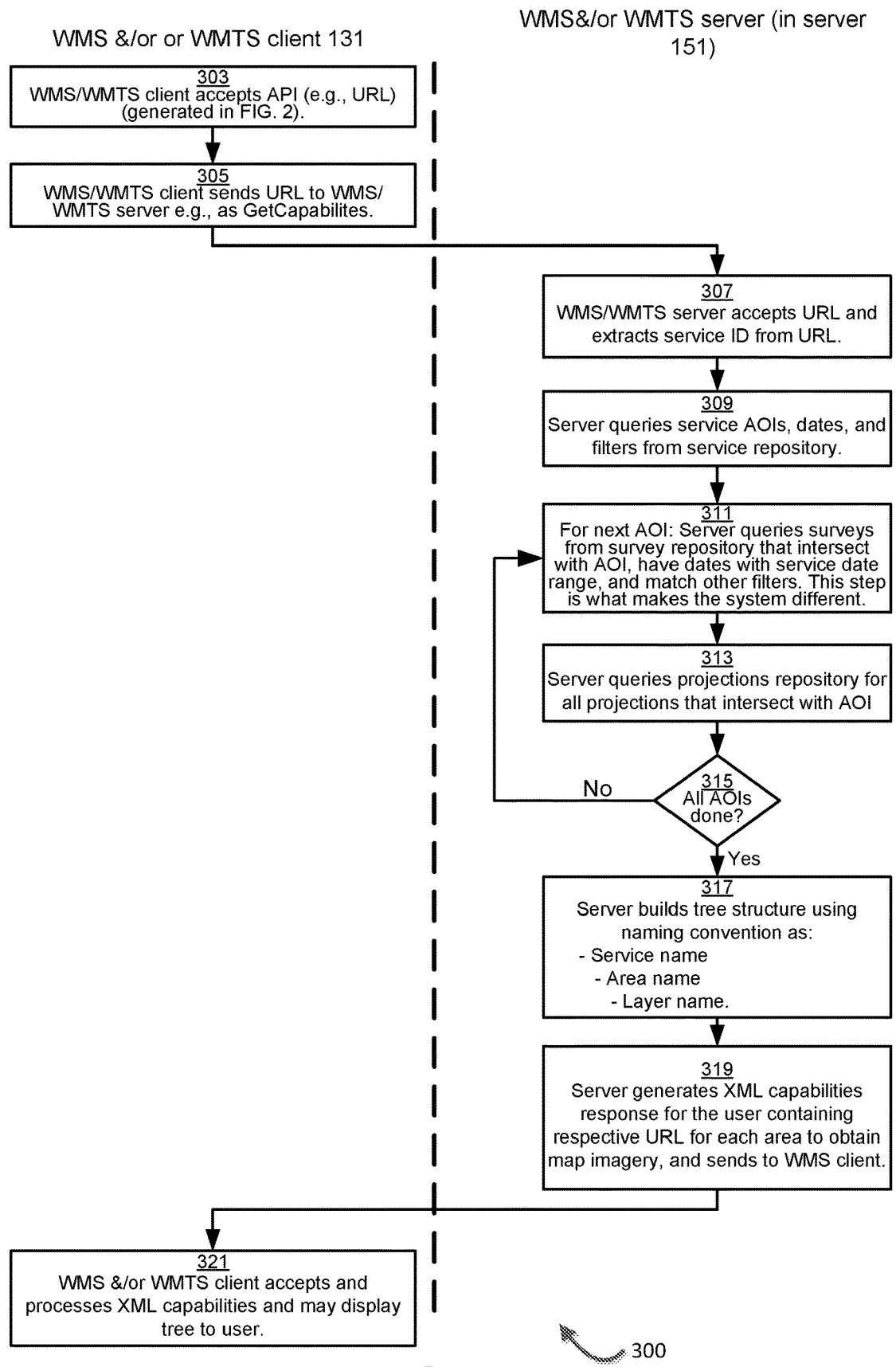
FIG. 3 shows, according to some embodiment of the present invention, a simplified flow chart of methods indicating how the API generated in the example flow chart of FIG. 2 can be used to generate an XML capabilities response for the user, the XML capabilities response containing a respective URL for each area to obtain map imagery.

FIG. 3 shows, according to a WMS (or WMTS) embodiment of the present invention, a simplified flow chart of methods 300 indicating how the API, e.g., the URL generated in methods 200 can be used in a WMS (or WMTS) client as a GetCapabilities request to generate metadata, e.g., an XML capabilities response for the user from a coupled WMS (or WMTS) server, the XML capabilities response containing a respective URL for each area to obtain map imagery, e.g., on a WMS (or WMTS) client system. Methods 300 includes method steps carried out at a WMS client, e.g., WMS client 131, and at a WMS server, e.g., as included in server system 151. The WMTS embodiment is similar, except for details of differences that would be clear to one or ordinary skill in the art.

At 303, the WMS (or WMTS) client 131 accepts from the user the API, e.g., the URL generated according to the flowchart shown in FIG. 2. In 305, the WMS (or WMTS) client sends this API, e.g., URL as a GetCapabilities request to the WMS (or WMTS) server in the server processing system 151.

In 307, WMS (or WMTS) server accepts the API, e.g., URL (the GetCapabilities request) and extracts the Service ID from the API (the GetCapabilities request). The Service ID is used in 309 to query the service AOIs, associated date ranges, and any associated filters in the service repository 156. Once the AOIs are available, in 311, for each AOI, starting with a first AOI and continuing with the next AOI until all AOIs have been queried, the WMS server, e.g., that of the survey provider, queries surveys that are maintained in a survey repository 156 in the storage subsystem 153 to find surveys that intersect with the AOI, have dates within the AOI's associated date range, and match any other filters associated with the AOI. In this manner, one aspect of the invention is that once a user specifies in 203 a user-generated service name and a user-defined naming convention for a number of areas, each area having a single user-named AOI and associated date range, the method and system of the present invention can dynamically obtain the currently available surveys that meet the user-specified criteria. Similarly, in step 313, the WMS server queries projections repository for all projections that intersect with this AOI. Steps 311 and 313 are repeated for all AOIs. For example, in step 315, a check is made to ascertain if surreys and projections for all AOIs have been found. If not, steps 311 and 313 are repeated for the next AOI, otherwise the process continues to the next step 317.

The next time the processes of FIG. 2 and FIG. 3 (for the WMS and WMTS embodiments), the set of surveys that intersect and the projections may be different in that there may be one or more additional surveys within the date range and other criteria, and some of the previously found surveys may no longer be available.

In step 317, the method and server builds a structure, e.g., a tree structure using a naming convention as a service name as a node, with AOI names as children of the service name node, and for each AOI name, layer names for that AOI as children of the AOI name node. Of course, structures other than tree structures may be used. Using this data, in step 319, the method (and system) generates an XML capabilities response for the user, the XML capabilities response containing a respective URL for each AOI to enable obtaining map imagery. The WMS server and sends the XML capabilities response to the WMS client 131.

In 321, the WMS client accepts and processes the XML capabilities response, and in some versions, displays the tree structure to the user to enable the user to select a map to display on the WMS client.

Additionally, the server extracts service and area identifiers from the layer identifier. As part of requesting an image to be displayed, one embodiment of the invention provides the projection identifier. This is normally set once in the client software and all requests to WMS are made using that projection.

Continuing with the WMS and WMTS embodiments, Using the API provided by the method of FIG. 2 in a WMTS embodiment also follows the flow chart of FIG. 3, with modifications for the differences that would be clear to one of ordinary skill in the art. First, a WMTS implementation may involve a WMTS client, which may be the client system 131. So steps 303, 305, and 321 are carries out in a WMTS client that is coupled to, e.g., via the network 191 (e.g., the Internet) a WMTS server, e.g., in server 151. Blocks 307, 309, 311, 313, 315, 317, and 319 are carried out in such a WMTS server. In step 317, the tree structure built is for a tiled map service. The capabilities XML generated in 319 is a WMTS capabilities XML that describes the TileMatrixSet of integer coordinates.

The WMTS embodiment is included in the drawing. The WMTS embodiment may also include a WMS embodiment, i.e., the same systems may operate with either WMS or WMTS.

TMS does not include the GetCapabilities request or the XML capabilities response. Therefore, the processes of FIG. 3 are not applicable. However, the information provided by the methods 200 described in FIG. 2 in the form of a template for TMS APIs to display tiled images, the user or client application has sufficient information to structure an API and thus obtain tiled maps.

Figure 4:
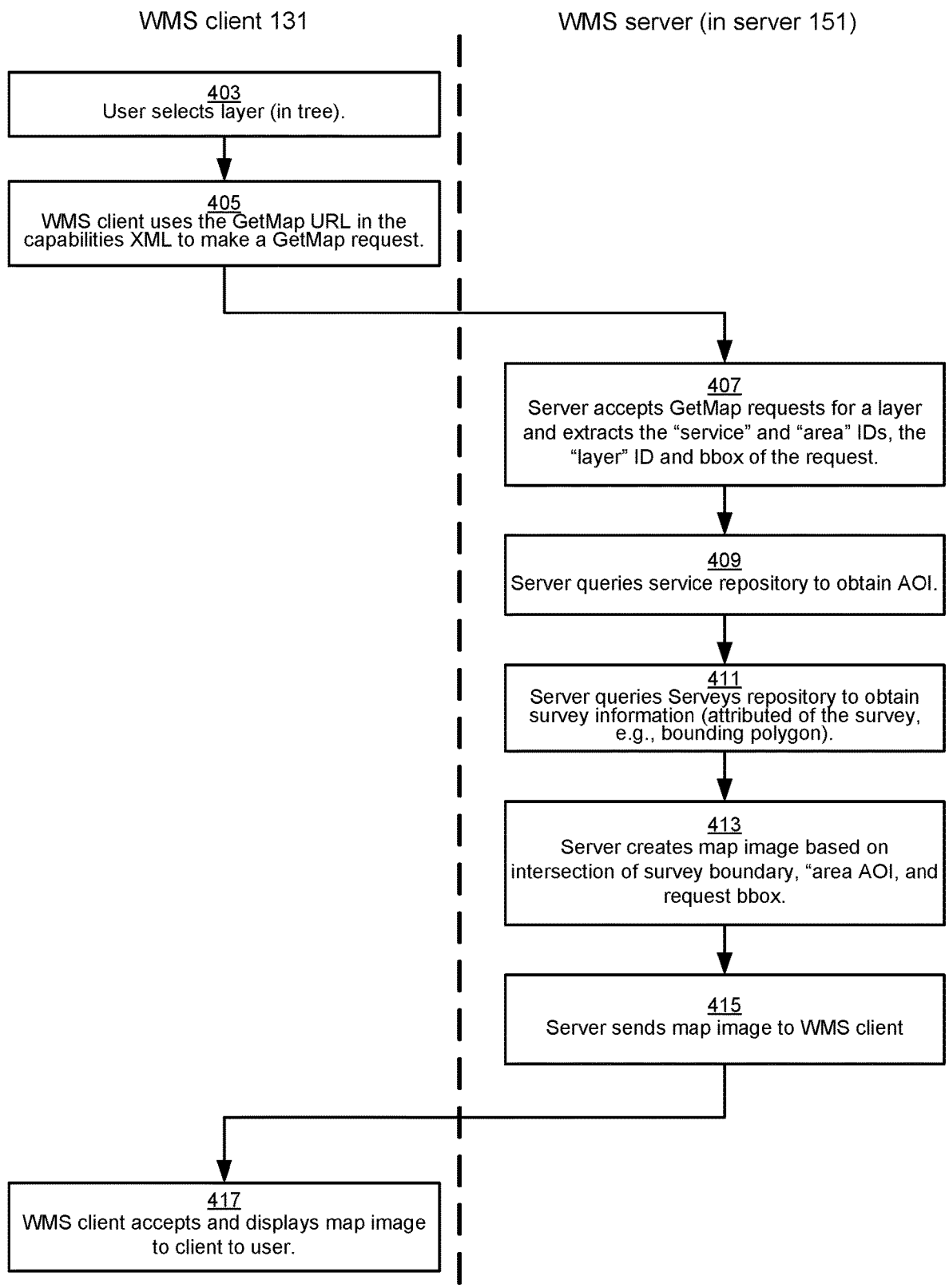
FIG. 4 shows, according to an embodiment of the present invention, a simplified flow chart of methods indicating how a GetMap request is implemented to generate a new display on the screen of an WMS client system.

FIG. 4 shows, according to a WMS embodiment of the present invention, a simplified flow chart of methods 400 indicating how a GetMap request is implemented. A GetMap occurs whenever a new display on the screen of the WMS client system 131 is desired, e.g., a zoom, a pan, and so forth. At the WMS client 131, as a result of the tree structure being displayed in step 321, in 403, a user selects a layer from the tree structure. In 405, the WMS client uses the GetMap URL in the capabilities XML to carry out a GetMap request. At the WMS server (in server system 151), 407 includes the WMS server accepting GetMap request for a layer and extracting the "service" and "area" identifiers, the "layer" identifier and the bounding box (bbox) of the GetMap request. In 409, the WMS server queries the service repository 156 to obtain the AOI. The WMS server, in 411, queries the surveys repository 159 to obtain attributes of the survey, e.g., bounding polygon. This information is used in 413 by the WMS server to create a map image based on the intersection of the survey boundary, the AOI, and bbox of the GetMap request. The created map image is sent to the WMS client in 415

At the WMS client system, 417 includes the WMS client accepting and displaying the map image to the user.

Figure 5:
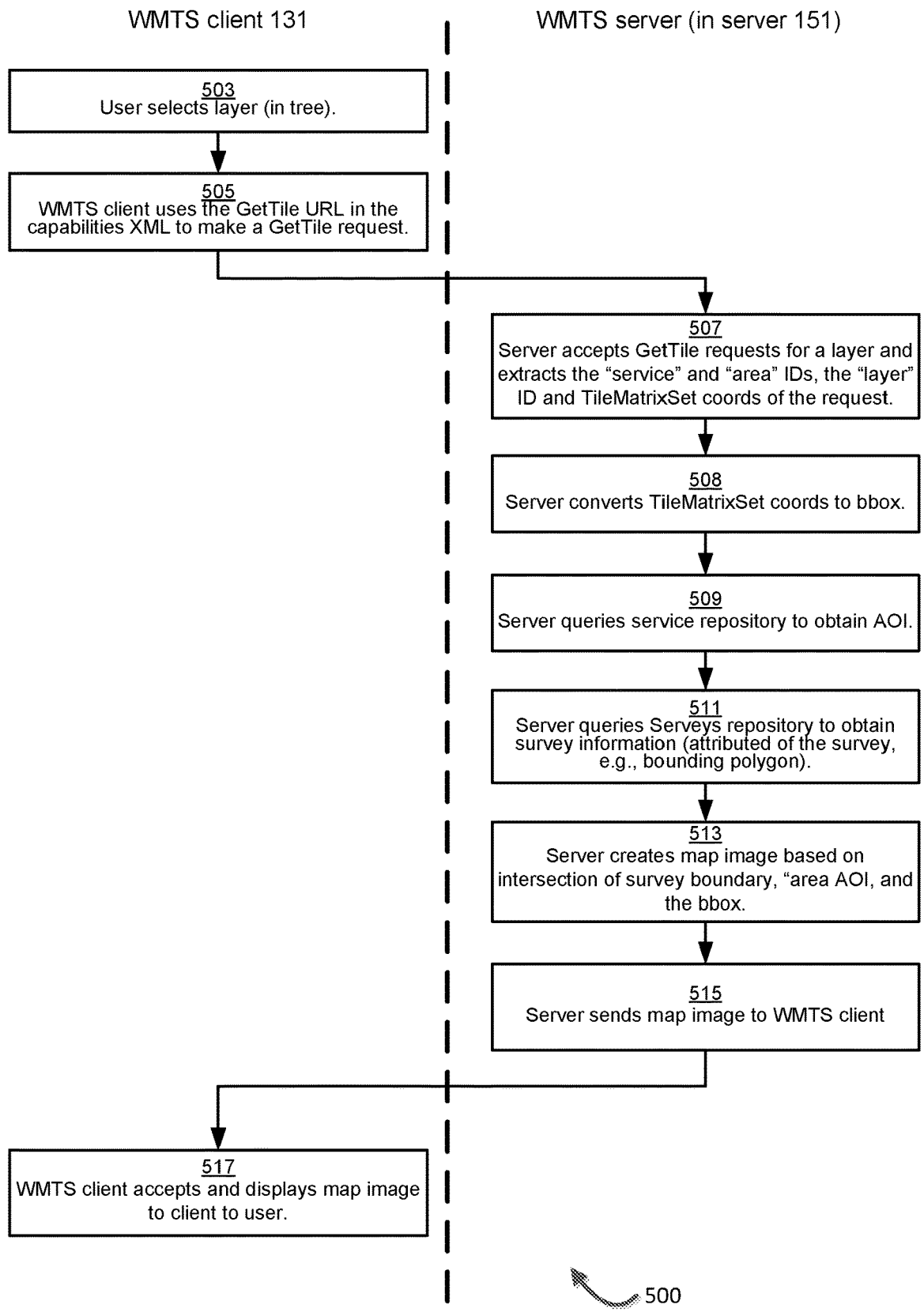
FIG. 5 shows, according to an embodiment of the present invention, a simplified flow chart of methods indicating how a GetTile request is implemented to generate a new display on the screen of an WMTS client system.

FIG. 5 shows, according to a WMTS embodiment of the present invention, a simplified flow chart of methods 500 indicating how a GetTile request is implemented. A GetTile occurs whenever a new tiled map display on the screen of the WMTS client system 131 is desired, e.g., a zoom, a pan, and so forth. At the WMTS client 131, as a result of the tree structure being displayed in step 321, in 503, a user selects a layer from the tree structure. In 505, the WMTS client uses the GetTile URL in the capabilities XML to carry out a GetTile request that includes "service" and "area" IDs, the "layer" ID and TileMatrixSet coordinates.

At the WMTS server, the server accepts GetTile requests for a layer and extracts the "service" and "area" IDs, the "layer" ID and Tile Matrix coordinates of the request.

At the WMTS server (in server system 151), 507 includes the WMTS server accepting GetTile request for a layer and extracting the "service" and "area" identifiers, the "layer" identifier and the TileMatrixSet coordinates of the GetTile request. 508 includes converting the TileMatrixSet coordinates to a bbox. In 509, the WMTS server queries the service repository 156 to obtain the AOI. The WMTS server, in 511, queries the tile repository (assumed in 159) to obtain attributes of the survey, e.g., bounding polygon. This information is used in 513 by the WMTS server to create a tile image based on the intersection of the survey boundary, the AOI, and bbox of the GetTile request. The created tiled map image is sent to the WMTS client in 515.

At the WMTS client system, 517 includes the WMTS client accepting and displaying the tiled map image to the user.

The flowchart of FIG. 5 may readily be modified by one skilled in the art to deal with a TMS version in which case the client is a TMS client system, and the server system is a TMS server. TMS does not support layers, so the method of display of FIG. 5 starts with a TMS modification of step 505 in which the API template provided in FIG. 2 is used to make a request analogous to the WMTS GetTile request. On the server side, since there are no layers specified, parts of the flowchart are simplified. Otherwise, the method on a TMS server would roughly follow the steps for a WMTS server taking into account the limitations of TMS.

Thus, a user would start as shown in FIG. 2 at a client system, define a service for one or more user-defined AOI/date range combinations, and obtain, in the WMS and WMTS cases, an API, e.g., in the form of a URL that can then be used as a GetCapabilities request via a WMS client or WMTS client to obtain, per FIG. 3, a WMS or WMTS compliant second API, in the form of a capabilities XML that can display to the user surveys available within the one or more user-defined AOI/date range combinations. The user can then select a map to display on the WMS terminal or WMTS terminal (FIG. 3). The API can be used at a different time to generate a new capabilities XML that has been automatically updated with any changes to the surveys available within the one or more user-defined AOI/date range combinations, so that map(s) in a newly added survey within the one or more AOI/date range combinations can be viewed. In the TMS case, the user would start as shown in FIG. 2 at a client system, define a service for one or more user-defined AOI/date range combinations, and obtain a template for an API, e.g., in the form of a URL template that when populated can display tiled image(s).

In some embodiments, the server supports pre-rendered tiles using any one of WMS, TMS, and WMTS.

One such server has may include a caching proxy in front of a conventional WMS server using GeoServer, Web Mapping Service-Cached (WMS-C), or GeoWebCache.

GeoServer is a Java-based server that allows users to view and edit geospatial data using open standards set forth by OGC.

Web Mapping Service-Cached (WMS-C) provides some means by which map clients can fetch tiles from existing WMS servers, in such a way that the images can be cached on the server, or at an intermediate location, or even be completely pre-generated, if desired. WMS-C (as in Web Mapping Service-Cached) as a constrained profile WMS to allows tiles to be cached at intermediate points. A WMS-C service would may only deliver images for bounding boxes aligned to a given rectangular origin and grid, and only at particular scale levels.

GeoWebCache is a Java web application used to cache map tiles coming from a variety of sources such as OGC Web Map Service (WMS). It implements various service interfaces (such as WMS-C, WMTS, TMS, Google Maps KML, Virtual Earth).

While in this description, the metadata returned from initially defining an area or areas to the server system is in the form of an XML document, in alternate embodiments, a different format may be returned to the client processing system, for example using JSON.

While the description herein described methods, systems, and non-transitory computer readable media that operate according to WMS and/or WMTS, embodiments of the invention also are applicable to other known service interfaces, such as Google Maps KML, Virtual Earth, and so forth. Modifying any of the described methods, systems, and non-transitory computer readable media to so conform to another such known service would be straightforward to one of ordinary skill such that such a person can make and use the invention with such other known service interface without undue experimentation.

General

As used herein, a date ranges is not necessarily limited to a range of one or more dates with the granularity of days, but rather may be a range of date and time combinations. Therefore, it is possible that a date range may be a single date and two times within that single date.

Unless specifically stated otherwise, as apparent from the following discussions, it is appreciated that throughout the specification discussions utilizing terms such as "processing," "computing," "calculating," "determining" or the like, refer to the action and/or processes of a host device or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory.

The methodologies described herein are, in one embodiment, performable by one or more processors that accept machine-readable instructions, e.g., as firmware or as software, that when executed by one or more of the processors carry out at least one of the methods described herein. In such embodiments, any processor capable of executing a set of instructions (sequential or otherwise) that specify actions to be taken may be included. Thus, one example is a programmable DSP device. Another is the CPU of a microprocessor or other computer-device, or the processing part of a larger ASIC. A processing system may include a memory subsystem including main RAM and/or a static RAM, and/or ROM. A bus subsystem may be included for communicating between the components. The processing system further may be a distributed processing system with processors coupled wirelessly or otherwise, e.g., by a network. If the processing system requires a display, such a display may be included. The processing system in some configurations may include a sound input device, a sound output device, and a network interface device. The memory subsystem thus includes a machine-readable non-transitory medium that is coded with, i.e., has stored therein a set of instructions to cause performing, when executed by one or more processors, one of more of the methods described herein. Note that when the method includes several elements, e.g., several steps, no ordering of such elements is implied, unless specifically stated. The instructions may reside in the hard disk, or may also reside, completely or at least partially, within the RAM and/or other elements within the processor during execution thereof by the system. Thus, the memory and the processor also constitute the non-transitory machine-readable medium with the instructions.

Furthermore, a non-transitory machine-readable medium may form a software product. For example, it may be that the instructions to carry out some of the methods, and thus form all or some elements of the inventive system or apparatus, may be stored as firmware. A software product may be available that contains the firmware, and that may be used to "flash" the firmware.

Note that while some diagram(s) only show(s) a single processor and a single memory that stores the machine-readable instructions, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a non-transitory machine-readable medium coded with, i.e., having stored therein a set of instructions for execution on one or more processors, e.g., one or more processors that are part of the receiver forming a pen stroke capture system.

Note that, as is understood in the art, a machine with application-specific firmware for carrying out one or more aspects of the invention becomes a special purpose machine that is modified by the firmware to carry out one or more aspects of the invention. This is different than a general purpose processing system using software, as the machine is especially configured to carry out the one or more aspects. Furthermore, as would be known to one skilled in the art, if the number the units to be produced justifies the cost, any set of instructions in combination with elements such as the processor may be readily converted into a special purpose ASIC or custom integrated circuit. Methodologies and software have existed for years that accept the set of instructions and particulars of, for example, the processing engine 131, and automatically or mostly automatically great a design of special-purpose hardware, e.g., generate instructions to modify a gate array or similar programmable logic, or that generate an integrated circuit to carry out the functionality previously carried out by the set of instructions. Thus, as will be appreciated by those skilled in the art, embodiments of the present invention may be embodied as a method, an apparatus such as a special purpose apparatus, an apparatus such as a data DSP device plus firmware, or a non-transitory machine-readable medium. The machine-readable carrier medium carries host device readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form a computer program product on a non-transitory machine-readable storage medium encoded with machine-executable instructions.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a host device system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

All publications, patents, and patent applications cited herein are hereby incorporated by reference.

Any discussion of prior art in this specification should in no way be considered an admission that such prior art is widely known, is publicly known, or forms part of the general knowledge in the field.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Note that the claims attached to this description form part of the description, so are incorporated by reference into the description, each claim forming a different set of one or more embodiments. In jurisdictions that do not allow such incorporation by reference, the applicant reserves the right to insert by amendment such claims into the description, with each claim forming one embodiment or with some claims forming more than one embodiment in the case multiple dependent claims are used, and with such amendment not being new matter.

The invention claimed is:

1. A method of operating a server processing system for a map service, the server processing system coupled via a network to a client processing system and to a display device, the server processing system of the map service further coupled to a map service repository that maintains surveys, the method comprising:
   receiving from the client processing system an API determined at the map service server processing system or at a second server processing system, the API being for a set of one or more areas, the set defined by a user, each area having an associated area of interest ("AOI") and one or more associated dates,
   querying AOIs and associated date ranges maintained in the map service repository, the querying including, for each area of the API, and for each AOI of said each area of the API, starting with a first AOI and continuing with the next AOI until all AOIs of all areas have been queried, finding surveys in the map service depository that intersect with the AOI and that have dates within the AOI's associated date range of each area, and
   generating and sending to the client processing system metadata that provides one or more respective map-display APIs for one or more respective areas in the set such that using any one of the provided respective map-display APIs obtains map imagery of the respective area of the one map-display API on the display device,
   wherein the client processing system acts as a map service client for the map service, and
   wherein said finding surveys causes the generated and sent metadata to be automatically updated by taking into account any new surveys made available in the service repository prior to the querying of the AOIs and associated date ranges.

2. The method of claim 1, further comprising:
   accepting a getmap request or gettile request from the map service client, the getmap request or gettile request generated at the map service client from the metadata,
   querying the service repository and creating a map image; and
   sending the map image to the display device, the display device consequently displaying the map image.

3. The method of claim 1,
   wherein the map service client is a Web Map Service (WMS) client, the map service is a WMS service, the map service server is a WMS server, and the determined API is in the form of a URL usable by the WMS client as a GetCapabilities request.

4. The method of claim 3,
   wherein the metadata is in the form an XML structure that provides the one or more respective map-display APIs,
   wherein each respective map-display API is a respective URL for a WMS GetMap request,
   such the determined API provides a mechanism for the WMS client to request and obtain from the WMS server responsive to the request metadata that provides one or more respective map-display APIs for each area to obtain map imagery using the provided respective map-display API.

5. The method of claim 1,
   wherein the determined API is in the form an API template for the set, and the map service client populates the API template to form a populated API template.

6. The method claim 5,
   wherein the map service is a tiled map service,
   wherein the populated API template is received by the map service server processing system,
   wherein the provided one or more respective map-display APIs are for one or more respective areas in the set, and wherein using any one of the tiled map-display APIs obtains tiled map imagery of the respective area of the one tiled map display API.

7. The method of claim 6,
   wherein the map service client is a Web Map Tile Service (WMTS) client,
   wherein the map service server is a WMTS server,
   wherein the populated API is in the form of a URL usable by the WMTS client as a GetCapabilities request,
   wherein the metadata is in the form an XML structure that provides the one or more respective tiled map-display APIs, and
   wherein each respective is a respective URL for a WMTS GetTile request.

8. The method of claim 6,
   wherein the map service client is a Tile Map Service (TMS) client, and wherein the map service server is a TMS server, wherein the API template is in the form of a URL template,
   wherein the TMS server receives the populated URL template and forms one or more tiled map-display APIs for one or more respective areas in the set, wherein each of the one or more tiled map-display APIs is in the form of a respective URL for a TMS tiled map display request usable to obtain tiled map imagery.

9. The method of claim 1, wherein each area has one or more user-generated associated filters.

10. The method of claim 1,
wherein the set defined by the user is for a user-defined service for the set including a service name for the user-defined service using a user-specified naming convention for services,
wherein each area of the user-defined service has a named associated AOI, and
wherein the one or more associated dates being a single associated date or an associated range of dates.

11. The method of claim 1, wherein each date includes a time of day.

12. A processing system coupled via a network to a client processing system and coupled to a display device, the processing system comprising:
one or more processors; and
a storage subsystem comprising one or more non-transitory storage devices,
the processing system coupled to a map service repository that maintains surveys,
the storage subsystem including program instructions that when executed cause the processing system to operate as a map service server for a map service, including to carry out:
receiving from the client processing system an API determined at a at the map service server or at another processing system, the API being for a set of one or more areas, the set defined by a user, each area having an associated area of interest ("AOI") and one or more associated dates,
querying AOIs and associated date ranges maintained in the map service repository, the querying including, for each AOI, starting with a first AOI and continuing with the next AOI until all AOIs have been queried, finding surveys in the map service depository that intersect with said each AOI and that have dates within said AOI's associated date range, and
generating and sending to the client processing system metadata that provides one or more respective map-display APIs for one or more respective areas in the set such that using any one of the provided respective map-display APIs obtains map imagery of the respective area of the one map-display API on the display device,
wherein the client processing system acts as a map service client for the map service, and
wherein said finding surveys causes the generated and sent metadata to be automatically updated by taking into account any new surveys made available in the service repository prior to the generating of the metadata.

13. The processing system of claim 12,
wherein the program instructions when executed cause the processing system further to carry out:
accepting a getmap request or gettile request from the client processing system, the getmap request or gettile request generated at the client processing system from the metadata sent to the client processing system,
querying the service repository and creating a map image; and
sending the map image to the display device, the display device consequently displaying the map image.

14. The processing system of claim 12,
wherein the client processing system is a Web Map Service (WMS) client, the map service is a WMS service, the map service server is a WMS server, and the determined API is in the form of a URL usable by the WMS client as a GetCapabilities request.

15. The processing system of claim 14,
wherein the metadata is in the form an XML structure that provides the one or more respective tiled map-display APIs,
wherein each respective map-display API is a respective URL for a WMS GetMap request,
such the API provides a mechanism for the WMS client to request and obtain from the WMS server responsive to the request metadata that provides one or more respective map-display APIs for each area to obtain map imagery using the provided respective map-display API.

16. The processing system of claim 12,
wherein the generated API is in the form an API template for the set, and the map service client populates the API template to form a populated API template.

17. The processing system of claim 16,
wherein the populated API is received by the map service server processing system,
wherein the map service is a tiled map service,
wherein the provided one or more respective map-display APIs are for one or more respective areas in the set, and wherein using any one of the tiled map-display APIs obtains tiled map imagery of the respective area of the one tiled map display API.

18. The processing system of claim 17,
wherein the map service client is a Web Map Tile Service (WMTS) client,
wherein the map service server is a WMTS server,
wherein the API is in the form of a URL usable by the WMTS client as a GetCapabilities request,
wherein the metadata is in the form an XML structure that provides the one or more respective tiled map-display APIs, and
wherein each respective is a respective URL for a WMTS GetTile request.

19. The processing system of claim 17,
wherein the map service client is a Tile Map Service (TMS) client, and wherein the map service server is a TMS server, wherein the API template is in the form of a URL template,
such that the TMS server receiving the populated URL template and forms one or more tiled map-display APIs for one or more respective areas in the set,
wherein each of the one or more tiled map-display APIs is in the form of a respective URL for a TMS tiled map display request usable to obtain tiled map imagery.

20. The processing system claim 12, wherein each area has one or more user-generated associated filters.

21. The processing system of claim 12,
wherein the user-defined set is for a user-defined service for the set including a service name for the user-defined service using a user-specified naming convention for services,
wherein each area of the user-defined service has a named associated AOI, and
wherein the one or more associated dates being a single associated date or an associated range of dates.

22. A non-transitory machine-readable medium comprising instructions for a processing system for a map service, the processing system coupled via a network to a client processing system and to a display device, the processing system of the map service further coupled to a map service repository that maintains surveys, the instructions when executed cause carrying out a method comprising:

receiving from the client processing system an API determined at the map service processing system or at a second processing system, the API being for a set of one or more areas, the set defined by a user, each area having an associated area of interest ("AOI") and one or more associated dates, querying AOIs and associated date ranges maintained in the map service repository, the querying including, for each area of the API, and for each AOI of said each area of the API, starting with a first AOI and continuing with the next AOI until all AOIs of all areas have been queried, finding surveys in the map service depository that intersect with the AOI and that have dates within the AOI's associated date range of each area, and generating and sending to the client processing system metadata that provides one or more respective map-display APIs for one or more respective areas in the set such that using any one of the provided respective map-display APIs obtains map imagery of the respective area of the one map-display API on the display device, wherein the client processing system acts as a map service client for the map service, and wherein said finding surveys causes the generated and sent metadata to be automatically updated by taking into account any new surveys made available in the service repository prior to the querying of the AOIs and associated date ranges.

23. The non-transitory machine-readable medium of claim 22, wherein the method further comprises:

accepting a getmap request or gettile request from the map service client, the getmap request or gettile request generated at the map service client from the metadata, querying the service repository and creating a map image; and sending the map image to the display device, the display device consequently displaying the map image.

24. The non-transitory machine-readable medium of claim 22, wherein the map service client is a Web Map Service (WMS) client, the map service is a WMS service, the map service server is a WMS server, and the API is in the form of a URL usable by the WMS client as a GetCapabilities request.

25. The non-transitory machine-readable medium of claim 24, wherein the metadata is in the form an XML structure that provides the one or more respective tiled map-display APIs, wherein each respective map-display API is a respective URL for a WMS GetMap request, such the API provides a mechanism for the WMS client to request and obtain from the WMS server responsive to the request metadata that provides one or more respective map-display APIs for each area to obtain map imagery using the provided respective map-display API.

26. The non-transitory machine-readable medium of claim 22, wherein the generated API is in the form an API template for the set, and the client processing system populates the API template populates the API template to form a populated API template.

27. The non-transitory machine-readable medium of claim 26, wherein the map service is a tiled map service, wherein the provided one or more respective map-display APIs are for one or more respective areas in the set, and wherein using any one of the tiled map-display APIs obtains tiled map imagery of the respective area of the one tiled map display API.

28. The processing system of claim 27, wherein the map service client is a Web Map Tile Service (WMTS) client, wherein the map service server is a WMTS server, wherein the API is in the form of a URL usable by the WMTS client as a GetCapabilities request, wherein the metadata is in the form an XML structure that provides the one or more respective tiled map-display APIs, and wherein each respective is a respective URL for a WMTS GetTile request.

29. The processing system of claim 27, wherein the map service client is a Tile Map Service (TMS) client, and wherein the map service server is a TMS server, wherein the API template is in the form of a URL template, such that the TMS server receiving the populated URL template and forms one or more tiled map-display APIs for one or more respective areas in the set, wherein each of the one or more tiled map-display APIs is in the form of a respective URL for a TMS tiled map display request usable to obtain tiled map imagery.

* * * * *